(12) United States Patent
Tatiparthi et al.

(10) Patent No.: US 11,586,391 B2
(45) Date of Patent: Feb. 21, 2023

(54) TECHNIQUE FOR EFFICIENT MIGRATION OF LIVE VIRTUAL DISK ACROSS STORAGE CONTAINERS OF A CLUSTER

(71) Applicant: Nutanix, Inc., San Jose, CA (US)

(72) Inventors: Kiran Tatiparthi, Dublin, CA (US); Mukul Sharma, San Jose, CA (US); Saibal Kumar Adhya, Bangalore (IN); Sandeep Ashok Ghadage, Maharashtra (IN); Swapnil Ingle, Berlin (DE)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 17/161,331

(22) Filed: Jan. 28, 2021

(65) Prior Publication Data

US 2022/0188042 A1 Jun. 16, 2022

(30) Foreign Application Priority Data

Dec. 16, 2020 (IN) .............................. 202041054770

(51) Int. Cl.
*G06F 3/06* (2006.01)

(52) U.S. Cl.
CPC ............ *G06F 3/0665* (2013.01); *G06F 3/065* (2013.01); *G06F 3/067* (2013.01); *G06F 3/0613* (2013.01);
(Continued)

(58) Field of Classification Search
CPC ........ G06F 3/0647; G06F 3/065; G06F 3/067; G06F 3/0665
(Continued)

(56) References Cited

U.S. PATENT DOCUMENTS 7,143,307 B1 11/2006 Witte et al.
8,386,731 B2 2/2013 Mashtizadeh et al.
(Continued)

OTHER PUBLICATIONS

Crump, George "Why Storage vMotion hurts and how to stop the pain", from StorageSwiss.com at https://storageswiss.com/2015/08/18/why-storage-vmotion-hurts/, posted on Aug. 18, 2015, 4 pages.
(Continued)

*Primary Examiner* — Than Nguyen
(74) *Attorney, Agent, or Firm* — Cesari and McKenna, LLP

(57) ABSTRACT

A technique efficiently migrates a live virtual disk (vdisk) across storage containers of a cluster having a plurality of nodes deployed in a virtualization environment. Each node is embodied as a physical computer with hardware resources, such as processor, memory, network and storage resources, that are virtualized to provide support for one or more user virtual machines (UVM) executing on the node. The storage resources include storage devices embodied as a storage pool that is logically segmented into the storage containers configured to store one or more vdisks. The storage containers include a source container having associated storage policies and a destination container having different (new) storage policies. The technique enables migration of the live vdisk from the source container to the destination container without powering down the UVM and halting input/output accesses to the vdisk, and while maintaining uninterrupted servicing of data from the live vdisk during the migration transparent to the executing UVM.

39 Claims, 7 Drawing Sheets

(52) U.S. Cl.
CPC .......... *G06F 3/0647* (2013.01); *G06F 3/0652* (2013.01); *G06F 3/0683* (2013.01)

(58) Field of Classification Search
USPC .......................................................... 711/161
See application file for complete search history.

(56) References Cited

U.S. PATENT DOCUMENTS

| | | |
|---|---|---|
| 9,239,689 B2 | 1/2016 | Baron et al. |
| 9,836,327 B1 | 12/2017 | Brouwer et al. |
| 9,852,137 B2 | 12/2017 | Mann et al. |
| 9,933,937 B2 * | 4/2018 | Lemay ................ G06F 3/04886 |
| 9,977,688 B2 | 5/2018 | Nipane et al. |
| 10,007,463 B2 | 6/2018 | Colbert et al. |
| 10,025,505 B2 * | 7/2018 | Baptist ................ G06F 3/0619 |
| 10,152,387 B1 | 12/2018 | Chakraborty et al. |
| 10,719,307 B2 | 7/2020 | Kanada et al. |
| 10,809,935 B2 | 10/2020 | Balachandran et al. |
| 10,809,998 B2 | 10/2020 | Gopalapura Venkatesh et al. |
| 10,877,791 B2 | 12/2020 | Ramesh et al. |
| 2007/0239944 A1 * | 10/2007 | Rupanagunta ...... G06F 11/2005 711/147 |
| 2010/0049750 A1 | 2/2010 | Srivastava et al. |
| 2011/0208908 A1 | 8/2011 | Chou et al. |
| 2013/0282887 A1 * | 10/2013 | Terayama ............... G06F 3/061 709/223 |
| 2016/0188353 A1 * | 6/2016 | Shu ..................... G06F 9/45558 718/1 |
| 2016/0335007 A1 * | 11/2016 | Ryu ....................... G06F 3/0665 |
| 2016/0364174 A1 * | 12/2016 | Colbert .................. G06F 3/067 |
| 2019/0026101 A1 | 1/2019 | Gopalapura Venkatesh et al. |
| 2019/0205220 A1 | 7/2019 | Zhang |

OTHER PUBLICATIONS

VMware Manual—vCenter Server and Host Management, Update 1, VMware vSphere 7.0, VMware ES, Xi 7.0, vCenter Server 7.0, Modified on Nov. 25, 2020, 203 pages.
Citrix XenDesktop 7.1 on Microsoft Hyper-V Server 2012 R2 on Nutanix Virtual Computing Platform Solution Design Citrix Validated Solutions Jun. 25, 2014, 95 pages.

* cited by examiner

TECHNIQUE FOR EFFICIENT MIGRATION OF LIVE VIRTUAL DISK ACROSS STORAGE CONTAINERS OF A CLUSTER

CROSS-REFERENCE TO RELATED APPLICATIONS

The present application claims the benefit of India Provisional Patent Application Serial No. 202041054770, which was filed on Dec. 16, 2020, by Kiran Tatiparthi, et al. for TECHNIQUE FOR EFFICIENT MIGRATION OF LIVE VIRTUAL DISK ACROSS STORAGE CONTAINERS OF A CLUSTER, which is hereby incorporated by reference.

BACKGROUND

Technical Field

The present disclosure relates to virtualization environments and, more specifically, to migration of live virtual disks across storage containers of a cluster in a virtualization environment.

Background Information

A virtual machine (VW may refer to a specific software-based implementation of a physical machine, such as a physical computer, and its associated hardware resources in a virtualization environment. The hardware resources of the physical computer may be virtualized or transformed into underlying support for a fully functional VM that can execute (run) its own operating system and applications on the underlying hardware resources similar to a physical computer. The hardware resources include processor, memory, network and storage resources. The storage resources may include storage devices, such as solid state drives (SSDs) and/or hard disk drives (HDDs), which may be embodied as local, cloud, and/or networked storage and further virtualized into a storage pool of storage objects, such as files and/or logical units. The network resources may include support for file-based protocols, such as network file system (NFS), and/or block-based protocols, such as internet small computer system interface (iSCSI), used to issue input/output (I/O) requests to access the storage objects.

Multiple operating systems may run concurrently on the virtual machines of a single physical computer and share the hardware resources. By encapsulating entire resources of the computer including the processor, memory, operating system, network and storage devices, a VM is generally compatible with most standard operating systems, applications, and device drivers. Modern implementations allow several operating systems and applications to safely run at the same time on a single computer, with each having access to the resources it needs when it needs them.

Virtualization may be implemented by disposing a layer of software directly on the computer hardware or on a host operating system. The virtualization software contains a virtual machine monitor or "hypervisor," such as VMware's ESXi, Microsoft's Hyper-V, RedHat's KVM, and Nutanix's Acropolis Hypervisor (AHV), that allocates the hardware resources dynamically and transparently to manage interactions between the underlying hardware and one or more user virtual machines (UVMs) that run client software. That is, virtualization allows multiple UVMs to run on a single physical computer, with each UVM sharing the resources of the physical computer across multiple environments. Different UVMs can run different operating systems and multiple applications on the same physical computer. Virtualization may also provide a storage abstraction, such as virtual disks (vdisks), which may be exposed as storage objects and mounted as disks on the UVM so as to appear "virtually" as local storage.

Typically, the vdisks are grouped within a storage container corresponding to a logical segmentation of a physical storage pool that is associated with one or more storage policies (or properties), such as a degree of replication, erasure coding, and the like. As such, vdisks are subject to the storage policies of the associated storage container. However, changing the storage policies for a vdisk may require either (i) changing the storage policies on its existing storage container, which may interrupt servicing of data to the UVM to accommodate the change (i.e., vdisks of the storage container may be rendered temporarily off-line) or (ii) migrating the vdisk to a new storage container having the changed storage policies, which may also interrupt servicing of data to the UVM as the vdisk data is copied from the existing storage container to the new storage container. In either case, it is desirable to provide migration of a "live" vdisk associated with the changed storage policies while supporting uninterrupted servicing of data from the vdisk during the migration.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

Figure 1:
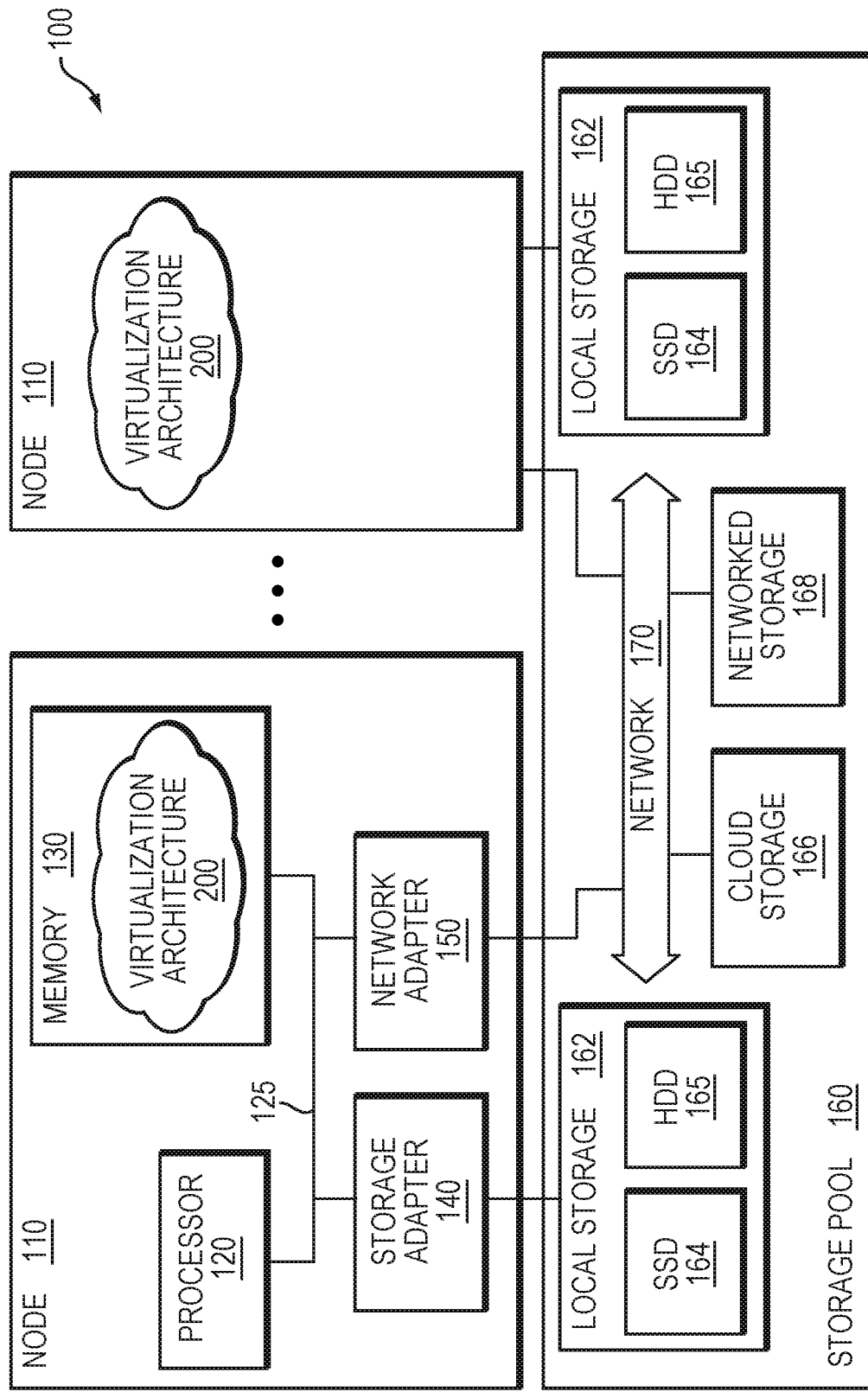
FIG. 1 is a block diagram of a plurality of nodes interconnected as a cluster in a virtualized environment.

The embodiments described herein are directed to a technique configured to efficiently migrate a live virtual disk (vdisk) across storage containers of a cluster having a plurality of nodes deployed in a virtualization environment. Each node is illustratively embodied as a physical computer with hardware resources, such as processor, memory, network and storage resources, that are virtualized to provide support for one or more user virtual machines (UVM) executing on the node. The storage resources include storage devices embodied as a storage pool that is logically organized (e.g., segmented) into the storage containers configured to store one or more vdisks. The storage containers include source and destination containers having different storage policies. The technique described herein enables migration of the live vdisk, i.e., linked to an executing UVM, from the source container to the destination container without powering down the UVM and halting input/output (I/O) accesses to the vdisk. As used herein, live vdisk migration denotes support for maintaining uninterrupted servicing of data from the vdisk during migration from the source container to the destination container such that the UVM is unaware that the underlying vdisk storage object has been altered to reside in a new (destination) storage container. That is, live migration of the vdisk is transparent to the UVM.

In accordance with the technique, forward migration of a vdisk (i.e., migration from source to destination containers) involves three storage objects: (1) a source vdisk on a source container to be migrated; (2) a target vdisk (a mirror vdisk) created on the destination container as a snapshot of the source vdisk with data copied (hydrated) from the source vdisk to the mirror vdisk so that the storage policies of the destination container are applied to the data; and (3) a live vdisk created as a mutable snapshot of the mirror vdisk, i.e., the live vdisk is able to receive I/O accesses, such as new write operations (writes) from the UVM. Notably, the mirror vdisk functions as a backing store for the live vdisk and may fetch data on-demand from the source vdisk as the mirror vdisk is hyrated.

Creation of the mirror vdisk on the destination container is based on an efficient low overhead snapshot mechanism that includes a data seeding process to copy data from the source vdisk to the mirror vdisk. Initially the mirror vdisk contains no data, i.e., the mirror vdisk is empty. The data seeding process, e.g., a scanner executing on the node, is initiated to efficiently hydrate data from the source vdisk to the mirror vdisk as a background process. During hydration of the mirror vdisk, the (different) storage policies of the destination container are applied to the mirror vdisk as the scanner writes the source vdisk data to the mirror vdisk. Note that the scanner may execute external to the UVM, illustratively in a separate controller VM, to support the transparent migration of the source vdisk as viewed by the UVM.

More specifically, the technique involves atomically creating the mutable snapshot (live vdisk) from the mirror vdisk at the destination container using the efficient low overhead snapshot mechanism (e.g., redirect-on-write) such that the mirror vdisk functions as a backing store for the live vdisk in a parent-child relationship. Upon creation of the live and mirror vdisks, I/O accesses from the UVM are re-directed to the live vdisk such that new writes are written to the live vdisk and reads of existing data (for as yet not overwritten address ranges of the live vdisk) are serviced by the mirror vdisk. From the perspective of the UVM, the live vdisk functions as the active vdisk transparently replacing the source vdisk and accepting new writes originally directed to the source vdisk, but now redirected to live vdisk. As such, the UVM is transparently attached (linked) to the live vdisk such that the I/O accesses issued by the UVM are re-directed and serviced by the live vdisk, while the mirror vdisk functions as backing store on the destination container.

I/O accesses by the UVM to its linked vdisk are re-directed to the live vdisk while the scanner seeds (backfills) data from the source vdisk to the mirror vdisk. To that end, the scanner may use updated lists of data blocks for transfer from the source vdisk to the mirror vdisk that eliminate address ranges of data overwritten in the live vdisk to reduce unnecessary copying of data. Upon completion of the data seeding, the mirror vdisk is completely hydrated such that its data content "mirrors" the content of the source vdisk and, therefore, the source vdisk on the source container may be deleted. Note that during the live vdisk migration, no other snapshot (or clone) of the live vdisk is permitted at the destination container to avoid address mapping tiering due to data overwritten in other dependent storage objects.

In an embodiment, the UVM may decide to abort or cancel an ongoing live vdisk migration across the source and destination containers. In that case, the procedure described above is effectively reversed: data of the original live vdisk on the destination container is moved back to the source container (i.e., reverse migration) and new write data stored in original live vdisk of the destination container is reconciled in the source container. Reverse migration is essentially a direct reversal of forward migration that uses a new mirror vdisk having data copied from the original target vdisk (original live vdisk) and a new target vdisk (new live vdisk) that accepts new writes from the UVM at the source container.

According to the technique, reverse migration involves four storage objects that are similar to the storage objects used during forward migration, but are mostly on the source container: (1) the original source vdisk on the source container; (2) a new mirror vdisk on the source container that is created as a snaphot of the original live vdisk on the destination container with copying (hydrating) of re-directed data from the original live vdisk to the new mirror vdisk; (3) the original live disk (i.e., target vdisk) on the destination container; and (4) a new live vdisk on the source container that is created as a mutable snapshot of the new mirror vdisk. Notably, the new mirror vdisk functions as a backing store for the new live vdisk and may fetch data on-demand from the target vdisk as the new mirror vdisk is hyrated. The storage objects on the source container are organized hierarchically in a chain of storage objects so that the original source vdisk is the root (parent) of the new mirror vdisk and the new live vdisk is a leaf of the chain, i.e., a child of the new mirror vdisk.

The technique further involves suspending the forward copy operation, deleting the original mirror vdisk and creating the new (empty) mirror vdisk on the source container. Data from original live vdisk is copied to the new mirror disk in a reverse direction (i.e., from the destination container to the source container). In addition, the scanner is employed to seed data from the original live vdisk of the destination container to the new mirror disk on the source container such that the original live vdisk functions as a new source vdisk during reverse migration. Similar to forward migration, I/O accesses from the UVM are re-directed to the source container for the new live vdisk. Only the data written to the original live disk are copied back to the new mirror disk, i.e., data that was originally re-directed to the original live vdisk of the destination container is hydrated back to the source container, if it has not yet been overwritten at the new live vdisk. Thus, the oldest data residing in the original source vdisk may be overwritten in the new mirror vdisk which, in turn, may be overwritten in the new live vdisk. Once the background data seed transfer is complete, the original live vdisk may be deleted.

DESCRIPTION

FIG. 1 is a block diagram of a plurality of nodes 110 interconnected as a cluster 100 and configured to provide compute and storage services for information, i.e., data and metadata, stored on storage devices of a virtualization environment. Each node 110 is illustratively embodied as a physical computer having hardware resources, such as one or more processors 120, main memory 130, one or more storage adapters 140, and one or more network adapters 150 coupled by an interconnect, such as a system bus 125. The storage adapter 140 may be configured to access information stored on storage devices, such as solid state drives (SSDs) 164 and magnetic hard disk drives (HDDs) 165, which are organized as local storage 162 and virtualized within multiple tiers of storage as a unified storage pool 160, referred to as scale-out converged storage (SOCS) accessible cluster-wide. To that end, the storage adapter 140 may include input/output (I/O) interface circuitry that couples to the storage devices over an I/O interconnect arrangement, such as a conventional peripheral component interconnect (PCI) or serial ATA (SATA) topology.

The network adapter 150 connects the node 110 to other nodes 110 of the cluster 100 over network 170, which is illustratively an Ethernet local area network (LAN). The network adapter 150 may thus be embodied as a network interface card having the mechanical, electrical and signaling circuitry needed to connect the node 110 to the network 170. The multiple tiers of SOCS include storage that is accessible through the network 170, such as cloud storage 166 and/or networked storage 168, as well as the local storage 162 within or directly attached to the node 110 and managed as part of the storage pool 160 of storage objects, such as files and/or logical units (LUNs). The cloud and/or networked storage may be embodied as network attached storage (NAS) or storage area network (SAN) and include combinations of storage devices (e.g., SSDs and/or HDDs) from the storage pool 160. Communication over the network 170 may be effected by exchanging discrete frames or packets of data according to protocols, such as the Transmission Control Protocol/Internet Protocol (TCP/IP) and the OpenID Connect (OIDC) protocol, although other protocols, such as the User Datagram Protocol (UDP) and the Hyper-Text Transfer Protocol Secure (HTTPS) may also be advantageously employed.

The main memory 120 includes a plurality of memory locations addressable by the processor 120 and/or adapters for storing software code (e.g., processes and/or services) and data structures associated with the embodiments described herein. The processor and adapters may, in turn, include processing elements and/or circuitry configured to execute the software code, such as virtualization software of virtualization architecture 200, and manipulate the data structures. As described herein, the virtualization architecture 200 enables each node 110 to execute (run) one or more virtual machines that write data to the unified storage pool 160 as if they were writing to a SAN. The virtualization environment provided by the virtualization architecture 200 relocates data closer to the virtual machines consuming the data by storing the data locally on the local storage 162 of the cluster 100 (if desired), resulting in higher performance at a lower cost. The virtualization environment can horizontally scale from a few nodes 110 to a large number of nodes, enabling organizations to scale their infrastructure as their needs grow.

It will be apparent to those skilled in the art that other types of processing elements and memory, including various computer-readable media, may be used to store and execute program instructions pertaining to the embodiments described herein. Also, while the embodiments herein are described in terms of software code, processes, and computer (e.g., application) programs stored in memory, alternative embodiments also include the code, processes, and programs being embodied as logic, components, and/or modules consisting of hardware, software, firmware, or combinations thereof.

Figure 2:
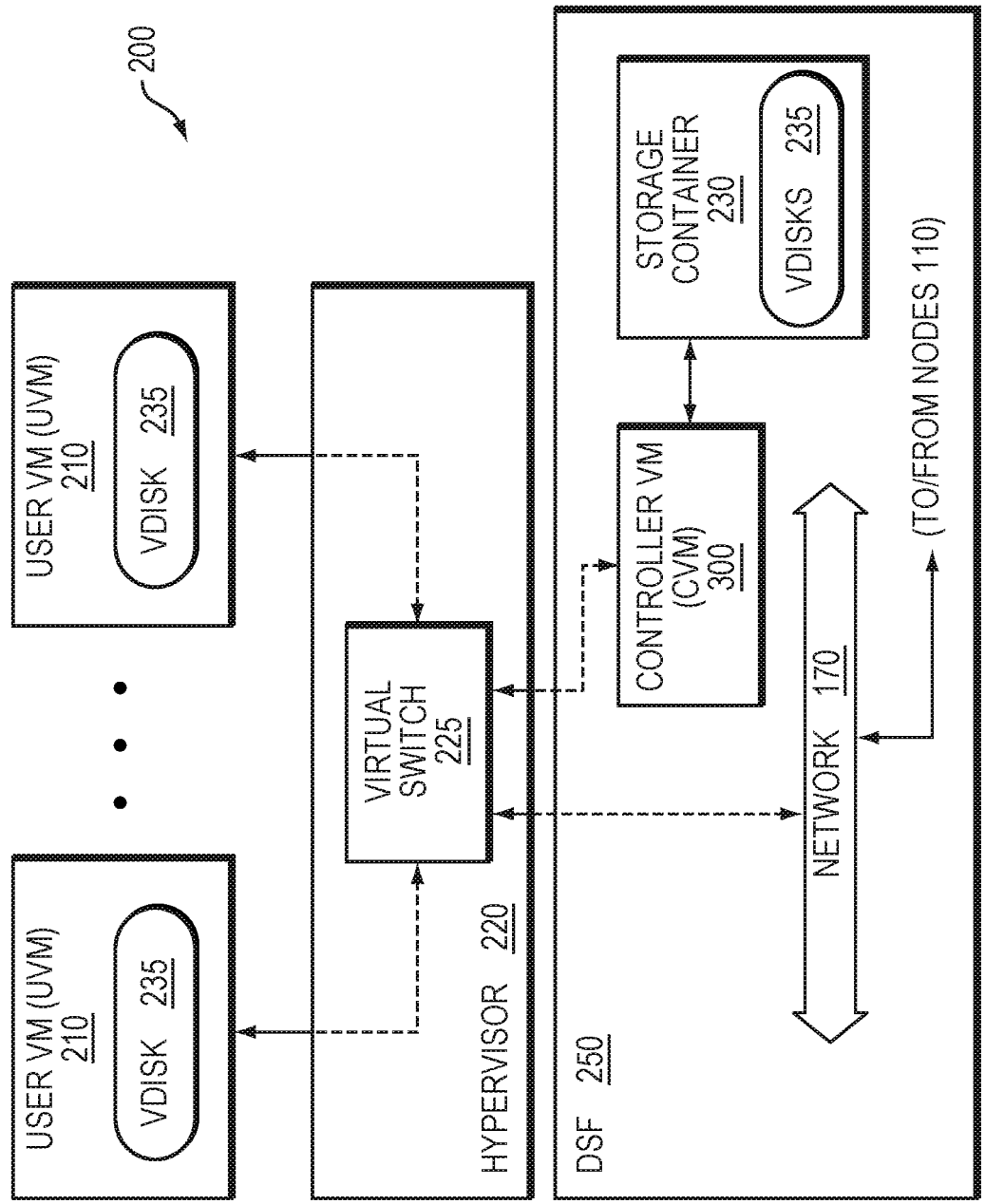
FIG. 2 is a block diagram of a virtualization architecture executing on a node to implement the virtualization environment.

FIG. 2 is a block diagram of a virtualization architecture 200 executing on a node to implement the virtualization environment. Each node 110 of the cluster 100 includes software components that interact and cooperate with the hardware resources to implement virtualization. The software components include a hypervisor 220, which is a virtualization platform configured to mask low-level hardware operations from one or more guest operating systems executing in one or more user virtual machines (UVMs) 210 that run client software. The hypervisor 220 allocates the hardware resources dynamically and transparently to manage interactions between the underlying hardware and the UVMs 210. In an embodiment, the hypervisor 220 is illustratively the Nutanix Acropolis Hypervisor (AHV), although other types of hypervisors, such as the Xen hypervisor, Microsoft's Hyper-V RedHat's KVM, and/or VMware's ESXi, may be used in accordance with the embodiments described herein.

Another software component running on each node 110 is a special virtual machine, called a controller virtual machine (CVM) 300, which functions as a virtual controller for SOCS. The CVMs 300 on the nodes 110 of the cluster 100 interact and cooperate to form a distributed system that manages all storage resources in the cluster. Illustratively, the CVMs and storage resources that they manage provide an abstraction of a distributed storage fabric (DSF) 250 that scales with the number of nodes 110 in the cluster 100 to provide cluster-wide distributed storage of data and access to the storage resources with data redundancy across the cluster. That is, unlike traditional NAS/SAN solutions that are limited to a small number of fixed controllers, the virtualization architecture 200 continues to scale as more nodes are added with data distributed across the storage resources of the cluster. As such, the cluster operates as a hyperconvergence architecture wherein the nodes provide both storage and computational resources available cluster-wide.

The client software (e.g., applications) running in the UVMs 210 may access the DSP 250 using file system protocols, such as the network file system (NFS) protocol, the common internet file system (CIFS) protocol and the internet small computer system interface (iSCSI) protocol. Operations on these file system protocols are interposed at the hypervisor 220 and redirected (via virtual switch 225) to the CVM 300, which exports one or more iSCSI, CIFS, or NFS targets organized from the storage objects in the storage pool 160 of DSF 250 to appear as disks to the UVMs 210. These targets are virtualized, e.g., by software running on the CVMs, and exported as virtual disks (vdisks) 235 to the UVMs 210. In some embodiments, the vdisk is exposed via iSCSI, CIFS or NFS and is mounted as a virtual disk on the UVM 210. User data (including the guest operating systems) in the UVMs 210 reside on the vdisks 235 and operations on the vdisks are mapped to physical storage devices (SSDs and/or HDDs) located in DSF 250 of the cluster 100.

In an embodiment, the virtual switch 225 may be employed to enable I/O accesses from a UVM 210 to a storage device via a CVM 300 on the same or different node 110. The UVM 210 may issue the I/O accesses as a SCSI protocol request to the storage device. Illustratively, the hypervisor 220 intercepts the SCSI request and converts it to an iSCI, CIFS, or NFS request as part of its hardware emulation layer. As previously noted, a virtual SCSI disk attached to the UVM 210 may be embodied as either an iSCSI LUN or a file served by an NFS or CIFS server. An iSCSI initiator, SMB/CIFS or NFS client software may be employed to convert the SCSI-formatted UVM request into an appropriate iSCSI, CIFS or NFS formatted request that can be processed by the CVM 300. As used herein, the terms iSCSI, CIFS and NFS may be interchangeably used to refer to an IP-based storage protocol used to communicate between the hypervisor 220 and the CVM 300. This approach obviates the need to individually reconfigure the software executing in the UVMs to directly operate with the IP-based storage protocol as the IP-based storage is transparently provided to the UVM.

For example, the IP-based storage protocol request may designate an IP address of a CVM 300 from which the UVM 210 desires I/O services. The IP-based storage protocol request may be sent from the UVM 210 to the virtual switch 225 within the hypervisor 220 configured to forward the request to a destination for servicing the request. If the request is intended to be processed by the CVM 300 within the same node as the UVM 210, then the IP-based storage protocol request is internally forwarded within the node to the CVM. The CVM 300 is configured and structured to properly interpret and process that request. Notably the IP-based storage protocol request packets may remain in the node 110 when the communication—the request and the response—begins and ends within the hypervisor 220. In other embodiments, the IP-based storage protocol request may be routed by the virtual switch 225 to a CVM 300 on another node of the cluster 100 for processing. Specifically, the IP-based storage protocol request is forwarded by the virtual switch 225 to a physical switch (not shown) for transmission over network 170 to the other node. The virtual switch 225 within the hypervisor 220 on the other node then forwards the request to the CVM 300 on that node for further processing.

Figure 3:
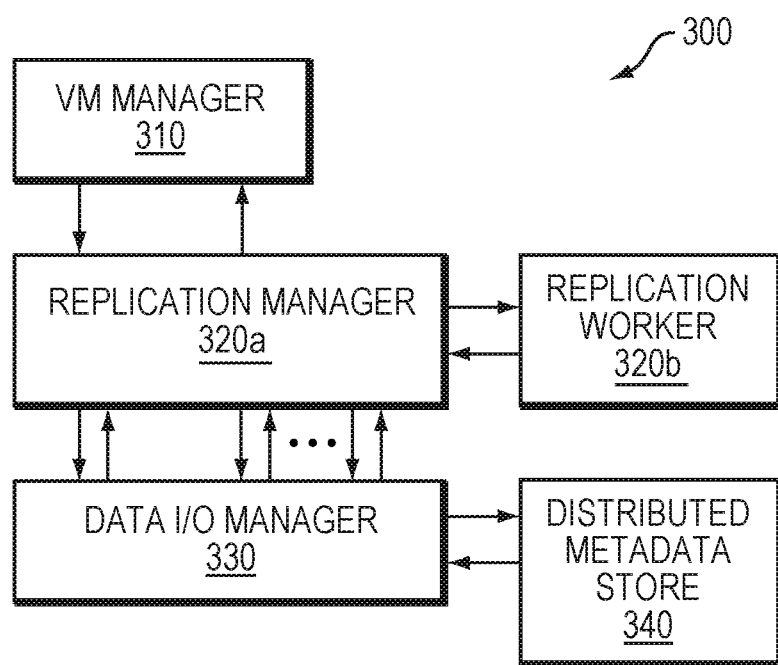
FIG. 3 is a block diagram of a controller virtual machine of the virtualization architecture.

FIG. 3 is a block diagram of the controller virtual machine (CVM) 300 of the virtualization architecture 200. In one or more embodiments, the CVM 300 runs an operating system (e.g., the Acropolis operating system) that is a variant of the Linux® operating system, although other operating systems may also be used in accordance with the embodiments described herein. The CVM 300 functions as a distributed storage controller to manage storage and I/O activities within DSP 250 of the cluster 100. Illustratively, the CVM 300 runs as a virtual machine above the hypervisor 220 on each node and cooperates with other CVMs in the cluster to form the distributed system that manages the storage resources of the cluster, including the local storage 162, the networked storage 168, and the cloud storage 166. Since the CVMs run as virtual machines above the hypervisors and, thus, can be used in conjunction with any hypervisor from any virtualization vendor, the virtualization architecture 200 can be used and implemented within any virtual machine architecture, allowing the CVM to be hypervisor agnostic. The CVM 300 may therefore be used in variety of different operating environments due to the broad interoperability of the industry standard IP-based storage protocols (e.g., iSCSI, CIFS, and NFS) supported by the CVM.

Illustratively, the CVM 300 includes a plurality of processes embodied as a storage stack running in a user space of the operating system of the CVM to provide storage and I/O management services within DSF 250. The processes include a virtual machine (VM) manager 310 configured to manage creation, deletion, addition and removal of virtual machines (such as UVMs 210) on a node 110 of the cluster 100. For example, if a UVM fails or crashes, the VM manager 310 may spawn another UVM 210 on the node. A replication manager 320a is configured to provide replication and disaster recovery capabilities of DSF 250. Such capabilities include migration/failover of virtual machines and containers, as well as scheduling of snapshots. In an embodiment, the replication manager 320a may interact with one of more replication workers 320b. A data I/O manager 330 is responsible for all data management and I/O operations in DSF 250 and provides a main interface to/from the hypervisor 220, e.g., via the IP-based storage protocols. Illustratively, the data I/O manager 330 presents a vdisk 235 to the UVM 210 in order to service I/O access requests by the UVM to the DFS. A distributed metadata store 340 stores and manages all metadata in the node/cluster, including metadata structures that store metadata used to locate (map) the actual content of vdisks on the storage devices of the cluster.

Figure 4:
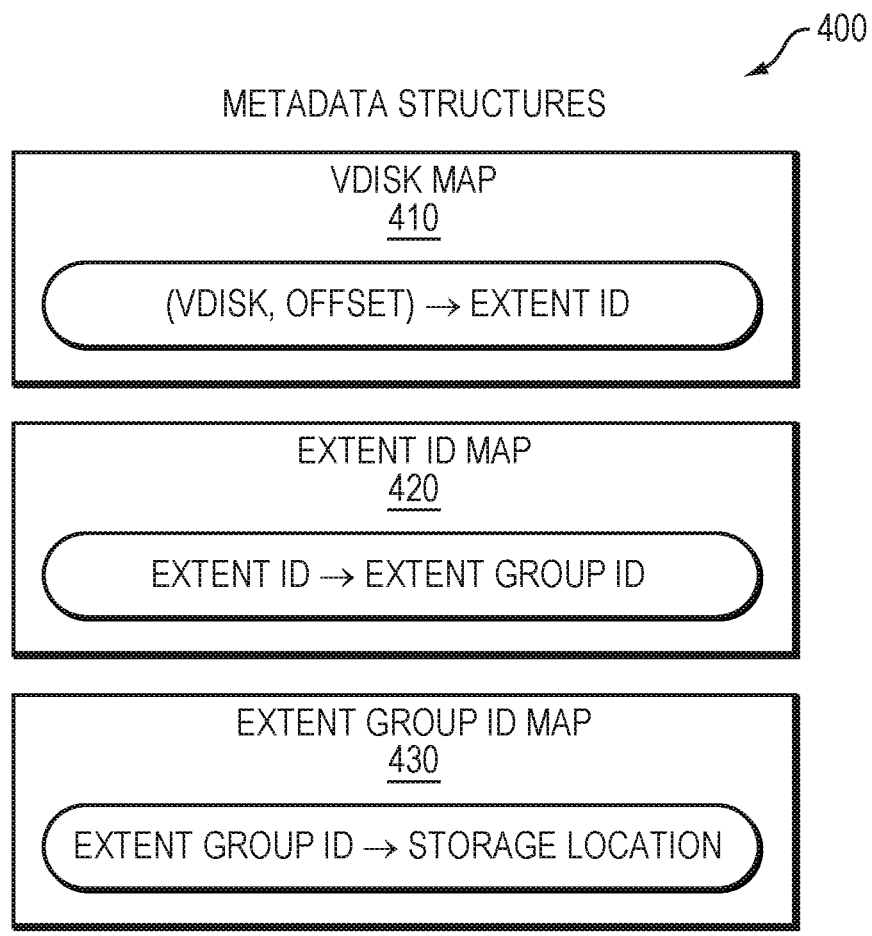
FIG. 4 is a block diagram of metadata structures used to map virtual disks (vdisks) of the virtualization architecture.

FIG. 4 is block diagram of metadata structures 400 used to map virtual disks of the virtualization architecture. Each vdisk 235 corresponds to a virtual address space for storage exposed as a disk to the UVMs 210. Illustratively, the address space is divided into equal sized units called virtual blocks (vblocks). A vblock is a chunk of pre-determined storage, e.g., IMB, corresponding to a virtual address space of the vdisk that is used as the basis of metadata block map structures described herein. The data in each block is physically stored on a storage device in units called extents. Extents may be written/read/modified on a sub-extent basis (called a slice) for granularity and efficiency. A plurality of extents may be grouped together in a unit called an extent group. Each extent and extent group may be assigned a unique identifier (ID), referred to as an extent ID and extent group ID, respectively. An extent group is a unit of physical allocation that is stored as a file on the storage devices.

Illustratively, a first metadata structure embodied as a vdisk map 410 is used to logically map the vdisk address space for stored extents. Given a specified vdisk and offset, the logical vdisk map 410 may be used to identify a corresponding extent (represented by extent ID). A second metadata structure embodied as an extent ID map 420 is used to logically map an extent to an extent group. Given a specified extent ID, the logical extent ID map 420 may be used to identify a corresponding extent group containing the extent. A third metadata structure embodied as an extent group ID map 430 is used to map a specific physical storage location for the extent group. Given a specified extent group ID, the physical extent group ID map 430 may be used to identify information corresponding to the physical location of the extent group on the storage devices such as, for example, (1) an identifier of a storage device that stores the extent group, (2) a list of extent IDs corresponding to extents in that extent group, and (3) information about the extents, such as reference counts, checksums, and offset locations.

Figure 5:
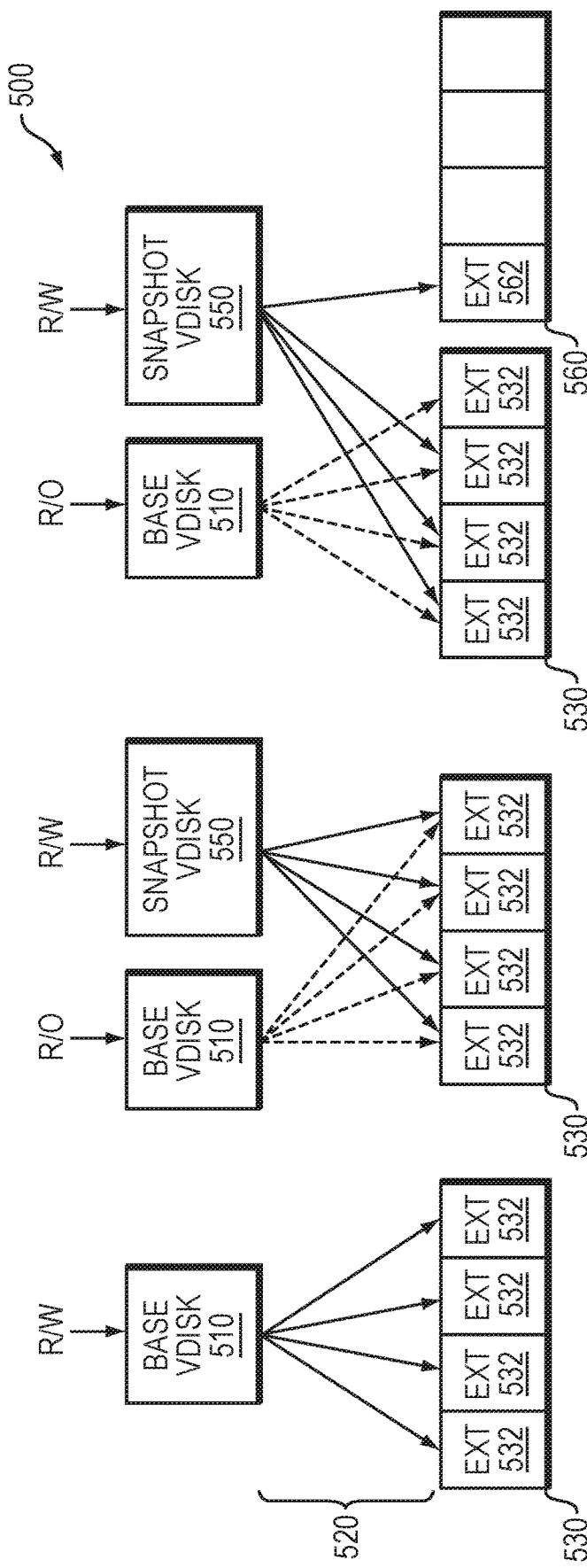
FIGS. 5A-5C are block diagrams of an exemplary mechanism used to create a snapshot of a vdisk.

In an embodiment, CVM 300 and DSF 250 cooperate to provide support for snapshots, which are point-in-time copies of storage objects, such as files, LUNs and/or vdisks. FIGS. 5A-5C are block diagrams of an exemplary mechanism 500 used to create a snapshot of a virtual disk. Illustratively, the snapshot may be created by leveraging an efficient low overhead snapshot mechanism, such as the redirect-on-write algorithm. As shown in FIG. 5A, the vdisk (base vdisk 510) is originally marked read/write (R/W) and has an associated block map 520, metadata mapping with pointers that reference (point to) the extents 532 of an extent group 530 storing data of the vdisk on storage devices of DSF 250. Advantageously, associating a block map with a vdisk obviates traversal of a snapshot chain, as well as corresponding overhead (e.g., read latency) and performance impact.

To create the snapshot (FIG. 5B), another vdisk (snapshot vdisk 550) is created by sharing the block map 520 with the base vdisk 510. This feature of the low overhead snapshot mechanism enables creation of the snapshot vdisk 550 without the need to immediately copy the contents of the base vdisk 510. Notably, the snapshot mechanism uses redirect-on-write such that, from the UVM perspective, I/O accesses to the vdisk are redirected to the snapshot vdisk 550 which now becomes the (live) vdisk and the base vdisk 510 becomes the point-in-time copy, i.e., an "immutable snapshot," of the vdisk data. The base vdisk 510 is then marked immutable, e.g., read-only (R/O), and the snapshot vdisk 550 is marked as mutable, e.g., read/write (R/W), to accommodate new writes and copying of data from the base vdisk to the snapshot vdisk. In an embodiment, the contents of the snapshot vdisk 550 may be populated at a later time using, e.g., a lazy copy procedure in which the contents of the base 510 are copied to the snapshot vdisk 550 over time. The lazy copy procedure may configure DSF 250 to wait until a period of light resource usage or activity to perform copying of existing data in the base vdisk. Note that each vdisk includes its own metadata structures 400 used to identify and locate extents owned by the vdisk.

Another procedure that may be employed to populate the snapshot vdisk 550 waits until there is a request to write (i.e., modify) data in the snapshot vdisk 550. Depending upon the type of requested write operation performed on the data, there may or may not be a need to perform copying of the existing data from the base vdisk 510 to the snapshot vdisk 550. For example, the requested write operation may completely or substantially overwrite the contents of a vblock in the snapshot vdisk 550 with new data. Since the existing data of the corresponding vblock in the base vdisk 510 will be overwritten, no copying of that existing data is needed and the new data may be written to the snapshot vdisk at an unoccupied location on the DSF storage (FIG. 5C). Here, the block map 520 of the snapshot vdisk 550 directly references a new extent 562 of a new extent group 560 storing the new data on storage devices of DSF 250. However, if the requested write operation only overwrites a small portion of the existing data in the base vdisk 510, the contents of the corresponding vblock in the base vdisk may be copied to the snapshot vdisk 550 and the new data of the write operation may be written to the snapshot vdisk to modify that portion of the copied vblock. A combination of these procedures may be employed to populate the data content of the snapshot vdisk.

As noted, a vdisk 235 is a storage abstraction (i.e., structured from the storage devices in storage pool 160 of DSF 250) that is exposed by a CVM 300 for use by a UVM 210 through attachment, e.g., establishment of a link, to the vdisk 235. A plurality of vdisks 235 may be grouped within a storage container 230 corresponding to a logical segmentation of the storage pool 160. For convenience, storage efficiency policies (e.g., such as replication, erasure coding, deduplication, encryption and compression) are applied on a container basis. Users can therefore easily update storage policies for a group of vdisks by changing the storage policies of the storage container 230. However, changing the storage policies of a single vdisk 235 within an existing storage container 230 may require migrating (copying) the vdisk to a different (new) storage container, which may interrupt servicing of data if the vdisk is "live," i.e., attached or linked to a running UVM 210, due to rearranging of metadata data of the storage container to accommodate the changed storage policy. This problem may be addressed by powering down the UVM 210, creating the new storage container with the changed storage policies and copying the vdisk 235 from the existing storage container to the new storage container. However, powering down of the UVM 210 requires halting of the I/O accesses issued by the UVM to the vdisk and, thus, breaking the stale link to the vdisk during the migration to the different storage container.

The embodiments described herein are directed to a technique configured to efficiently migrate a live vdisk across storage containers of a cluster having a plurality of nodes deployed in a virtualization environment. The storage containers include source and destination containers having different storage policies. The technique described herein enables migration of the live vdisk, i.e., linked to an executing UVM, from the source container to the destination container without powering down the UVM and halting I/O accesses to the vdisk. As used herein, live vdisk migration denotes support for maintaining uninterrupted servicing of data from the vdisk during migration from a source container to a destination container such that the UVM is unaware that the underlying vdisk storage object has been altered to reside in a new (destination) storage container. That is, live migration of the vdisk is transparent to the UVM.

In accordance with the technique, forward migration of a vdisk (i.e., migration is from source to destination containers) involves three storage objects: (1) a source vdisk on a source container to be migrated; (2) a target vdisk (a mirror vdisk) created on the destination container as a snapshot of the source vdisk with data copied (hydrated) from the source vdisk to the mirror vdisk so that the storage policies of the destination container are applied to the data; and (3) a live vdisk created as a mutable snapshot of the mirror vdisk, i.e., the live vdisk is able to receive I/O accesses, such as new write operations (writes) from the UVM. Notably, the mirror vdisk functions as a backing store for the live vdisk and may fetch data on-demand from the source vdisk as the mirror vdisk is hyrated.

Creation of the mirror vdisk on the destination container is based on an efficient low overhead snapshot mechanism that includes a data seeding process to copy data from the source vdisk to the mirror vdisk. Initially the mirror vdisk contains no data, i.e., the mirror vdisk is empty. The data seeding process, e.g., a scanner executing on the node, is initiated to efficiently hydrate data from the source vdisk to the mirror vdisk as a background process. During hydration of the mirror vdisk, the (different) storage policies of the destination container are applied to the mirror vdisk as the scanner writes the source vdisk data to the mirror vdisk. Note that the scanner may execute external to the UVM, illustratively in a separate controller VM, to support the transparent migration of the source vdisk as viewed by the UVM.

More specifically, the technique involves atomically creating the mutable snapshot (live vdisk) from the mirror vdisk at the destination container using the efficient low overhead snapshot mechanism (e.g., redirect-on-write) such that the mirror vdisk functions as a backing store for the live vdisk in a parent-child relationship. Upon creation of the live and mirror vdisks, I/O accesses from the UVM are re-directed to the live vdisk such that new writes are written to the live vdisk and reads of existing data (for as yet not overwritten address ranges of the live vdisk) are serviced by the mirror vdisk. From the perspective of the UVM, the live vdisk functions as the active vdisk transparently replacing the source vdisk and accepting new writes originally directed to the source vdisk, but now redirected to live vdisk. As such, the UVM is transparently attached (linked) to the live vdisk such that the I/O accesses issued by the UVM are re-directed and serviced by the live vdisk, while the mirror vdisk functions as backing store on the destination container. In accordance with the parent-child relationship, the live vdisk functions as a writable (i.e., mutable) snapshot of the mirror vdisk for new writes, while the mirror vdisk functions as a backing store for data from the source vdisk yet not overwritten in the live vdisk.

I/O accesses by the UVM to its linked vdisk are re-directed to the live vdisk while the scanner seeds (backfills) data from the source vdisk to the mirror vdisk. To that end, the scanner may use updated lists of data blocks for transfer from the source vdisk to the mirror vdisk that eliminate address ranges of data overwritten in the live vdisk to reduce unnecessary copying of data. Upon completion of the data seeding, the mirror vdisk is completely hydrated such that its data content "mirrors" the content of the source vdisk and, therefore, the source vdisk on the source container may be deleted. Note that during the live vdisk migration, no other snapshot (or clone) of the live vdisk is permitted at the destination container to avoid address mapping tiering due to data overwritten in other dependent storage objects.

Figure 6:
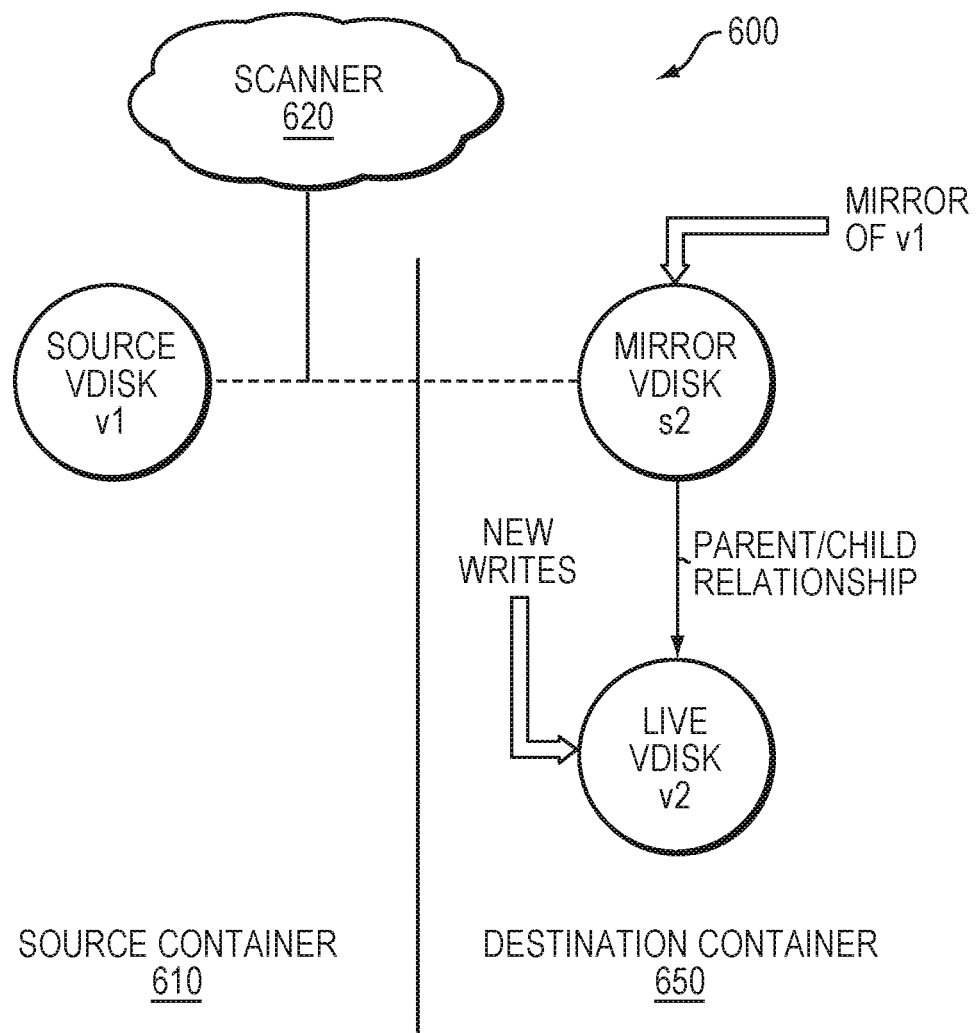
FIG. 6 is a diagram illustrating forward migration of a live vdisk migration technique.

FIG. 6 is a diagram illustrating forward migration 600 of the live vdisk migration technique. The storage containers include source container 610 having associated storage policies and destination container 650 having different (new) storage policies. Illustratively, vdisk migration is started by the VM manager 310 issuing a vdisk migration request to the replication manager 320a via, e.g., a "start live vdisk migrate" remote procedure call (RPC). According to the technique, forward migration involves three (3) phases: setup initiation, data copying (hydrating from the source container to the destination container) and cutover. In the setup initiation phase, the replication manager 320a issues a setup request (e.g., via a "setup vdisk migration" RPC) to the data I/O manager 330. In response, the data I/O manager 330 creates a mirror vdisk S2 on the destination container 650 from a source vdisk V1 on the source container 610 using the efficient low overhead snapshot mechanism that includes the data seeding process. Initially the mirror vdisk S2 contains no data, i.e., the mirror vdisk S2 is empty, and all data is located in the source vdisk V1. In the data copying phase, the data seeding process, e.g., a scanner 620 executing on the node 110, is initiated (e.g., spawned by the replication manager 320) that cooperates with the data I/O manager 330 to efficiently copy (hydrate) data from the source vdisk V1 to the mirror vdisk S2 as a background process. During hydration of the mirror vdisk V1, the scanner 620 is configured to apply the new storage policies of the destination container 650.

In addition, during the setup initiation phase, a "live" (i.e., mutable) snapshot (live vdisk V2) is atomically created from the mirror vdisk S2 on the destination container 650 using the efficient low overhead snapshot mechanism (e.g., redirect-on-write) such that the mirror vdisk S2 functions as a backing store for the live vdisk V2 (e.g., a parent-child relationship). As noted, the scanner may use updated lists of data blocks for transfer from the source vdisk V1 to the mirror vdisk S2 that eliminate address ranges of data overwritten in the live vdisk V2 to reduce unnecessary copying of data. Illustratively, a UVM 210 originally attached to the source vdisk V1 is attached (linked) to the live vdisk V2 by establishing an exemplary target/path to the live vdisk (e.g., an SMB or NFS mount path and an iSCSI target). In addition, the UVM 210 is attached to the mirror vdisk S2 through establishment of an exemplary file path to the mirror vdisk (functioning as the backing store) that is transparent to the UVM, wherein each file path is stored in a vdisk configuration file managed by a vdisk configuration manager (not shown) of the CVM 300.

The I/O accesses issued by the UVM 210 are thereafter initially directed to the live vdisk V2 on the destination container 650. For example, the UVM 210 may issue an I/O access (e.g., a write operation) that results in storage of new write data (new writes) on the live vdisk V2. However, once the live vdisk V2 and mirror vdisk S2 are created, I/O accesses from the UVM are re-directed to the live vdisk V2 such that new writes are written to the live vdisk and reads of existing data (for as yet not overwritten address ranges of the live vdisk) are requested from the mirror vdisk S2. From the perspective of the UVM, the live vdisk V2 functions as the active vdisk transparently replacing the source vdisk V1 and accepting new writes originally directed to the source vdisk, but now redirected to live vdisk V2. As such, the UVM is transparently attached (linked) to the live vdisk such that the I/O accesses issued by the UVM are re-directed and serviced by the live vdisk, while the mirror vdisk S2 functions as backing store that may fetch data on-demand from the source vdisk V1 as the mirror vdisk S2 is hyrated. The source vdisk V1 may be marked as read-only to avoid transfer of additional writes to the source vdisk.

In an embodiment, the replication manager 320a may interact with a replication worker 320b to calculate the changed regions of the live vdisk with respect to the source vdisk V1 (e.g., via a "changed regions" RPC) and provide the results to the data I/O manger 330 responsible for the data transfer (i.e., hydration of mirror vdisk S2). Notably, the scanner may use the changed regions information to eliminate address ranges of data overwritten in the live vdisk V2 to reduce unnecessary copying of data. The UVM 210 may issue another I/O access, e.g., a read operation, for data on the live vdisk V2 that, if not present on that vdisk, may be stored on the backing store and, accordingly, the data may be fetched from the mirror vdisk S2 on the destination container 650. However, if data of the read operation (read) has not yet been hydrated from the source vdisk V1 to the mirror vdisk S2, the read data may be fetched on-demand from source vdisk V1 on the source container 610. Note that the on-demand approach of fetching data may be leveraged to provide a performance improvement to the technique. That is, when fetching the on-demand read data from the source vdisk V1 on the source container 610, the technique hydrates the data into the mirror vdisk S2 (backing store) of the destination container 650 so that subsequent reads for the data directed to the live vdisk V2 may be serviced "locally" at the destination container, i.e., at the mirror vdisk S2.

Upon completion of data seeding, the cutover phase is entered as the mirror vdisk S2 is completely hydrated such that its data content "mirrors" the content of the source vdisk V1. Illustratively, all incoming I/O accesses to the source vdisk V1 on the source container 610 are switched over to the destination container 650, e.g., via a cutover RPC issued from the replication manager 320a to the data I/O manager 330. Therefore, the source vdisk V1 on the source container 610 may be deleted by, e.g., removing the file path to the source vdisk V1 (e.g., <source_ctr>/<vm_name>/<source_file_name>) from the vdisk configuration file.

In an embodiment, the UVM may decide to abort or cancel an ongoing live vdisk migration across the source and destination containers. In that case, the procedure described above is effectively reversed: data of the original live vdisk on the destination container is moved back to the source container (i.e., reverse migration) and new write data stored in original live vdisk of the destination container is reconciled in the source container. Reverse migration is essentially a direct reversal of forward migration that uses a new mirror vdisk having data copied from the original target vdisk (original live vdisk) and a new target vdisk (new live vdisk) that accepts new writes from the UVM at the source container.

Figure 7:
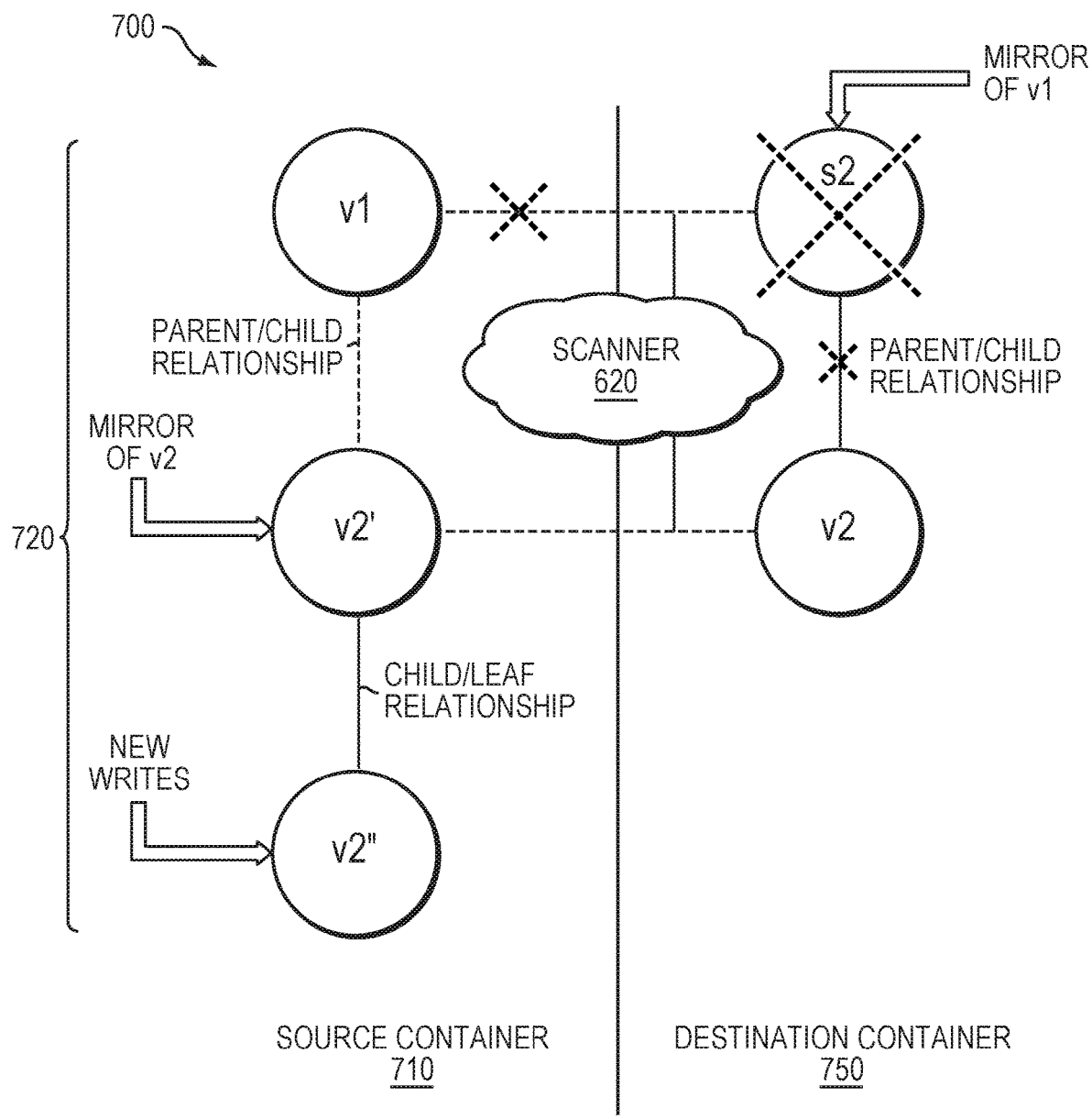
FIG. 7 is a diagram illustrating reverse migration of the live vdisk migration technique.

FIG. 7 is a diagram illustrating reverse migration 700 of the live vdisk migration technique. According to the technique, reverse migration involves four storage objects that are similar to the storage objects used during forward migration, but that are mostly on source container 710: (1) the original source vdisk V1 on the source container; (2) a new mirror vdisk V2' on the source container that is created as a snaphot of the original live vdisk on the destination container with copying (hydrating) of re-directed data from the original live vdisk to the new mirror vdisk; (3) the original live disk (i.e., target vdisk V2) on destination container 750; and (4) a new live vdisk V2" on the source container 710 that is created as a mutable snapshot of the new mirror vdisk. Notably, the new mirror vdisk V2' functions as a backing store for the new live vdisk V2" and may fetch data on-demand from the target vdisk V2 as the new mirror vdisk is hyrated. The storage objects on the source container 710 are organized hierarchically in a chain 720 of storage objects so that the original source vdisk V1 is the root (parent) of the new mirror vdisk V2' and the new live vdisk V2" is a leaf of the chain, i.e., a child of the new mirror vdisk.

The technique further involves suspending the forward copy (migration) operation, deleting the original mirror vdisk S2 on the destination container 750 and creating the new (empty) mirror vdisk V2' on the source container 710. Data from original live (target) vdisk V2 is copied to the new mirror disk in a reverse direction (i.e., from the destination container to the source container). In addition, the scanner 620 is employed to seed data from the target vdisk V2 of the destination container 750 to the new mirror disk V2' on the source container 710 such that the target vdisk V2 functions as a new source vdisk during reverse migration. Similar to forward migration, I/O accesses from the UVM 210 are re-directed to the source container 710 for the new live vdisk V2". Only the data (e.g., vblocks) written to the original live disk are copied back to the new mirror disk, i.e., data that was originally re-directed to the target vdisk V2 of the destination container 750 is hydrated back to the source container 710, if it has not yet been overwritten at the new live vdisk. Thus, the oldest data residing in the original source vdisk may be overwritten in the new mirror vdisk which, in turn, may be overwritten in the new live vdisk. Once the background data seed transfer is complete, the target (original live) vdisk V2 may be deleted.

In an embodiment, reverse migration 700 involves creating snapshots, e.g. using RPCs that are similar to those used during forward migration 600, yet in a reverse direction. Illustratively, a new storage object (e.g., snapshot) chain 720 is created wherein the original source vdisk V1 (during forward migration 600) is the root (parent) of the snapshot chain 720, the new mirror vdisk V2' is the child of the chain 720, and new live vdisk V2" is leaf of the chain 720. Further, because the vdisk migration transfer aborted, so too is the data seeding transfer from the original vdisk V1 to the original mirror disk S2. Thus, the original mirror vdisk S2 may be abandoned (e.g., deleted) as it only contains copies of data in original vdisk V1 now retained.

In addition, the scanner 620 is employed to seed data from the original live vdisk V2 of the destination container (i.e., during forward migration) to the new mirror vdisk V2' of the source container 710 such that the original live vdisk functions as a new source vdisk V2 of the destination container 750 during reverse migration 700. Illustratively, the new mirror vdisk V2' and the new live vdisk V2" are created in the source container 710. Only the data (e.g., vblocks) that have changed in new source vdisk V2 are transferred from the destination container 750 to target container 710. During reverse migration 700, new I/O accesses are re-directed to the new live vdisk V2" in the source container 710. Once the background data seed transfer is complete, the original live vdisk may be deleted.

Advantageously, the technique described herein enables migration of the live vdisk from a source container to a destination container to change storage properties associated with the vdisk without powering down the UVM and halting input/output (I/O) accesses to the vdisk. Notably, live vdisk migration supports maintaining uninterrupted servicing of data from the vdisk during migration from the source container to the destination container such that the executing UVM is unaware that the underlying vdisk storage object has been altered to reside in a new (destination) storage container. That is, live migration of the vdisk is transparent to the UVM.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method of virtual disk (vdisk) migration comprising:
creating a first mirror vdisk on a destination storage container associated with a first storage policy from a source vdisk on a source storage container associated with a second storage policy different from the first storage policy;
creating a first live vdisk as a mutable snapshot of the first mirror vdisk on the destination storage container, the first mirror vdisk functioning as a backing store for the first live vdisk;
redirecting service of a first input/output (I/O) access from the source vdisk to the first live vdisk; and
servicing the first I/O access at (i) the first live vdisk when the first I/O access is a write of new data or (ii) the first mirror vdisk when the first I/O access is a read of existing data not overwritten in the first live vdisk without interrupting servicing of I/O accesses during the vdisk migration.

2. The method of claim 1 further comprising:
copying the existing data from the source vdisk to the first mirror vdisk in a background process.

3. The method of claim 2 further comprising:
deleting the source vdisk upon completion of the copying of the existing data to the first mirror vdisk.

4. The method of claim 1 wherein the first and second storage policies pertain to different storage efficiency policies, such as replication and erasure coding.

5. The method of claim 1 wherein the read of existing data not yet overwritten in the first live vdisk includes a read not yet copied from the source vdisk to the first mirror vdisk.

6. The method of claim 1 wherein the source and destination storage containers are segmented from a storage pool across a cluster of nodes.

7. The method of claim 2 further comprising eliminating copying of the existing data from the source vdisk to the first mirror vdisk that is overwritten to the first live vdisk.

8. The method of claim 2 wherein the first I/O access originates from a first virtual machine and the copying of existing data from the source vdisk to the first mirror vdisk occurs in a second virtual machine separate from the first virtual machine.

9. The method of claim 1 wherein the source vdisk is marked immutable.

10. The method of claim 1 wherein a snapshot of the first live vdisk is prevented during the vdisk migration.

11. The method of claim 1 further comprising aborting the vdisk migration by:
    creating a second mirror vdisk on the source storage container based on the first live vdisk;
    creating a second live vdisk as a mutable snapshot of the second mirror vdisk on the source storage container, the second mirror vdisk functioning as a backing store for the second live vdisk;
    redirecting service of a second I/O access from the first live vdisk to the second live vdisk; and
    servicing the second I/O access at (iii) the second live vdisk when the second I/O access is a new write or (iv) the second mirror vdisk when the second I/O access is a read of data not yet overwritten in the second live vdisk.

12. The method of claim 11 further comprising:
    copying the data from the first live vdisk to the second mirror vdisk in a background process.

13. The method of claim 12 further comprising:
    deleting the first live vdisk upon completion of the copying of the data to the second mirror vdisk.

14. A non-transitory computer readable medium including program instructions executable on a processor of a node to enable virtual disk (vdisk) migration, the program instructions configured to:
    create a first mirror virtual disk (vdisk) on a destination storage container associated with a first storage policy from a source vdisk on a source storage container associated with a second storage policy different from the first storage policy;
    create a first live vdisk as a mutable snapshot of the first mirror vdisk on the destination storage container, the first mirror vdisk functioning as a backing store for the first live vdisk;
    redirect service of a first input/output (I/O) access from the source vdisk to the first live vdisk; and
    service the first I/O access at (i) the first live vdisk when the first I/O access is a write of new data or (ii) the first mirror vdisk when the first I/O access is a read of existing data not overwritten in the first live vdisk without interrupting servicing of I/O accesses during the vdisk migration.

15. The non-transitory computer readable medium of claim 14, wherein the program instructions are further configured to:
    copy the existing data from the source vdisk to the first mirror vdisk in a background process.

16. The non-transitory computer readable medium of claim 14, wherein the program instructions are further configured to:
    delete the source vdisk upon completion of the copying of the existing data to the first mirror vdisk.

17. The non-transitory computer readable medium of claim 14 wherein the first and second storage policies pertain to different storage efficiency policies, such as replication and erasure coding.

18. The non-transitory computer readable medium of claim 14 wherein the read of existing data not yet overwritten in the first live vdisk includes a read not yet copied from the source vdisk to the first mirror vdisk.

19. The non-transitory computer readable medium of claim 14 wherein the source and destination storage containers are segmented from a storage pool across a cluster of nodes.

20. The non-transitory computer readable medium of claim 15, wherein the program instructions are further configured to eliminate copying of the existing data from the source vdisk to the first mirror vdisk that is overwritten to the first live vdisk.

21. The non-transitory computer readable medium of claim 15 wherein the first I/O access originates from a first virtual machine and the copying of existing data from the source vdisk to the first mirror vdisk occurs in a second virtual machine separate from the first virtual machine.

22. The non-transitory computer readable medium of claim 14 wherein the source vdisk is marked immutable.

23. The non-transitory computer readable medium of claim 14 wherein a snapshot of the first live vdisk is prevented during the vdisk migration.

24. The non-transitory computer readable medium of claim 14, wherein the program instructions are further configured to abort the vdisk migration by program instructions configured to:
    create a second mirror vdisk on the source storage container based on the first live vdisk;
    create a second live vdisk as a mutable snapshot of the second mirror vdisk on the source storage container, the second mirror vdisk functioning as a backing store for the second live vdisk;
    redirect service of a second I/O access from the first live vdisk to the second live vdisk; and
    service the second I/O access at (iii) the second live vdisk when the second I/O access is a new write or (iv) the second mirror vdisk when the second I/O access is a read of data not yet overwritten in the second live vdisk without interrupting servicing during aborting of the vdisk migration.

25. The non-transitory computer readable medium of claim 24, wherein the program instructions further configured to abort the vdisk migration include further program instructions configured to:
    copy the data from the first live vdisk to the second mirror vdisk in a background process.

26. The non-transitory computer readable medium of claim 25, wherein the program instructions further configured to abort the vdisk migration include further program instructions configured to:
    delete the first live vdisk upon completion of the copying of the data to the second mirror vdisk.

27. An apparatus comprising:
    a node having a processor; and
    a source virtual disk (vdisk) servicing input/output (I/O) accesses across source and destination storage containers of the node, the processor configured to migrate the source vdisk across the storage containers by executing program instructions to:
- create a first mirror vdisk on the destination storage container from the source vdisk on the source storage container, the source storage container associated with a first storage policy different from a second storage policy associated with the destination storage container;
- create a first live vdisk as a mutable snapshot of the first mirror vdisk on the destination storage container, wherein the first mirror vdisk functions as a backing store for the first live vdisk; and
- redirect the I/O accesses from the source vdisk to the first live vdisk, wherein (i) new writes of the redirected I/O accesses are serviced by the first live vdisk and (ii) reads of the redirected I/O accesses for data not yet overwritten in the first live vdisk are serviced by the first mirror vdisk without interrupting servicing of I/O accesses during the source vdisk migration.

28. The apparatus of claim 27, wherein the program instructions further include program instructions to:
copy the data from the source vdisk to the first mirror vdisk in a background process.

29. The apparatus of claim 27, wherein the program instructions further include program instructions configured to:
delete the source vdisk upon completion of the copying of the data to the first mirror vdisk.

30. The apparatus of claim 27, wherein the first and second storage policies pertain to different storage efficiency policies, such as replication and erasure coding.

31. The apparatus of claim 27, wherein the read of data not yet overwritten in the first live vdisk includes a read not yet copied from the source vdisk to the first mirror vdisk.

32. The apparatus of claim 27, wherein the source and destination storage containers are segmented from a storage pool across a cluster of nodes.

33. The apparatus of claim 28, wherein the program instructions further include program instructions to eliminate copying of the data from the source vdisk to the first mirror vdisk that is overwritten to the first live vdisk.

34. The apparatus of claim 28, wherein the first I/O access originates from a first virtual machine and the copying of existing data from the source vdisk to the first mirror vdisk occurs in a second virtual machine separate from the first virtual machine.

35. The apparatus of claim 27, wherein the source vdisk is marked immutable.

36. The apparatus of claim 27, wherein a snapshot of the first live vdisk is prevented during the source vdisk migration.

37. The apparatus of claim 27, wherein the program instructions further include program instructions to abort the source vdisk migration by program instructions to:
- create a second mirror vdisk on the source storage container based on the first live vdisk;
- create a second live vdisk as a mutable snapshot of the second mirror vdisk on the source storage container, the second mirror vdisk functioning as a backing store for the second live vdisk;
- redirect service of a second I/O access from the first live vdisk to the second live vdisk; and
- service the second I/O access at (iii) the second live vdisk when the second I/O access is a new write or (iv) the second mirror vdisk when the second I/O access is a read of data not yet overwritten in the second live vdisk without interrupting servicing during aborting of the source vdisk migration.

38. The apparatus of claim 37, wherein the program instructions to abort the source vdisk migration further include program instructions to:
copy the data from the first live vdisk to the second mirror vdisk in a background process.

39. The apparatus of claim 38, wherein the program instructions to abort the source vdisk migration further include program instructions to:
delete the first live vdisk upon completion of the copying of the data to the second mirror vdisk.

* * * * *